United States Patent [19]
Kageyama

[11] Patent Number: 6,131,329
[45] Date of Patent: Oct. 17, 2000

[54] FISHING LURE AND SELECTION METHOD

[76] Inventor: Colin J. Kageyama, 2322 NE. Lindsey Dr., Hillsboro, Oreg. 97124

[21] Appl. No.: 09/012,121

[22] Filed: Jan. 22, 1998

[51] Int. Cl.[7] ..................................................... A01K 85/00
[52] U.S. Cl. .......................................................... 43/42.33
[58] Field of Search ................................. 43/42.5, 42.32, 43/42.33, 42.34

[56] References Cited

U.S. PATENT DOCUMENTS

| | | | |
|---|---|---|---|
| 2,188,753 | 1/1940 | Jennings | 43/42.5 |
| 2,817,922 | 12/1957 | Takeshita | 43/42.5 |
| 3,662,485 | 5/1972 | Klemkowski, Jr. | 43/42.5 |
| 3,952,445 | 4/1976 | Liebert | 43/42.34 |
| 4,599,820 | 7/1986 | Hill | 43/4.5 |
| 4,693,028 | 9/1987 | Hill | 43/4.5 |

*Primary Examiner*—Thomas Price
*Attorney, Agent, or Firm*—Kevin L. Russell; Chernoff Vilhauer McClung & Stenzel LLP

[57] ABSTRACT

An exemplary fishing lure includes a blade having on its rear-facing or inner surface one or more detail elements, such as an eye-shaped marking or dot, behind which is a background surface finish. Desirably, the detail element contrasts in underwater shade with the background lighting afforded by the surrounding water and the background surface finish likewise contrasts with the detail element thereby increasing that element's visual prominence per the optical principle of figure and ground to a fish just behind the lure moments prior to strike. Also, an inner surface finish behind and contrasting with the background surface finish increases the lure's visibility to a fish initially moving into alignment behind the lure while an outer surface finish contrasting with the background lighting increases the lure's visibility to a fish first noticing the lure while swimming a distance off to one side. The blade can comprise a spinner or spoon and, if a spoon, preferably the detail element includes a raised semi-transparent body, such as a bead of fluorescent plastic, backed by a highly reflective or silvered surface so as to be visible a greater percentage of time as the spoon flutters from side-to-side. Preferably, those color combinations which provide the maximum underwater contrast for given underwater lighting, water color, and maximum strike distance are objectively determined, such as by using optical filters to replicate the effects of the water, so that a clear procedure for preferentially selecting a particular lure from an assortment is identified.

22 Claims, 4 Drawing Sheets

| | LIGHTING | FILTER | WATER COLOR | MAX DISTANCE | BASE FINISH |
|---|---|---|---|---|---|
| 54 | BRIGHT | BLUE LIGHT | CLEAR | SHORT | BLACK |
| 56 | DARK | BLUE LIGHT | CLEAR | SHORT | SILVER/GOLD |
| 58 | BRIGHT | BLUE FILTER | CLEAR | FAR | BLACK |
| 60 | DARK | BLUE FILTER | CLEAR | FAR | SILVER |
| 62 | BRIGHT | GREEN LIGHT | GREEN | SHORT | BLACK/BRASS |
| 64 | DARK | GREEN LIGHT | GREEN | SHORT | SILVER |
| 66 | BRIGHT | GREEN FILTER | GREEN | FAR | BLACK/BRASS |
| 68 | DARK | GREEN FILTER | GREEN | FAR | SILVER |
| 70 | BRIGHT | RED LIGHT | MUDDY | SHORT | BLACK/BRASS |
| 72 | DARK | RED LIGHT | MUDDY | SHORT | GOLD |
| 74 | BRIGHT | RED FILTER | MUDDY | FAR | BLACK |
| 76 | DARK | RED FILTER | MUDDY | FAR | GOLD |

| BACKGROUND FINISH | DETAIL COLORATION |
|---|---|
| GREEN/YELLOW | BLACK |
| RED/PINK/ORANGE | GREEN |
| GREEN/YELLOW | BLACK/RED/PINK |
| BLACK | LUMINESCENT WHITE |
| GREEN/YELLOW | BLACK/RED |
| RED/PINK/ORANGE | GREEN/YELLOW |
| GREEN/YELLOW | BLACK/RED/PINK |
| BLACK/RED/PINK/ORANGE | GREEN/YELLOW |
| RED | BLACK |
| BLACK | YELLOW |
| YELLOW | BLACK |
| BLACK | YELLOW/LUM. WHITE |

FIG. 12

| BASE FINISH | BACKGROUND FINISH | DETAIL COLORATION |
|---|---|---|
| SILVER | RED/PINK/ORANGE | GREEN |
| SILVER | BLACK | LUMINESCENT WHITE |
| GOLD | BLACK | YELLOW |
| BLACK | YELLOW | BLACK |
| BLACK | GREEN | BLACK |
| BRASS | GREEN/YELLOW | BLACK/RED |

FISHING LURE AND SELECTION METHOD

BACKGROUND OF THE INVENTION

The present invention relates to a fishing lure and, in particular, relates to a fishing lure having surface features selected so that the target fish will be optimally attracted to the lure.

A variety of designs for many different types of lures are available or have been available in the past. Perhaps the most basic lures, at least in terms of design concept, are those having surface patterns which generally duplicate a certain type of natural bait or small fish. Such lures are described, for example, in Honse U.S. Pat. No. 4,307,531, Reeves, Jr. U.S. Pat. No. D358,863 and Merolillo U.S. Pat. No. D367,101.

In one variety of lure design, the lure constitutes a blade often bent in the middle to form a convex side. Depending on the size and shape of the blade and its method of attachment to the other lure elements, the blade will flutter or rotate with a greater or lesser angle as it is drawn through the water. Silver, gold, black, dark brass, mother-of-pearl and plastic are some of the materials which have been used in the manufacture of such blades. Normally, the leading or convex side of the blade is painted with either a solid color or with stripes, patches or other regular markings while the lagging or concave side of the blade is left unpainted so as to "flash" in the manner of iridescent fish scales while being pulled through the water. A general discussion of the manufacture of such lures is described by author A. D. Livingston in Chapter 4 of his book entitled *Luremaking: The Art and Science of Spinnerbaits, Buzzbaits, Jigs and Other Leadheads*, Ragged Mountain Press, ME (1994).

As noted by Livingston, many anglers prefer that the lure include markings that represent the features of a bait fish, such as scales, a throat or, most commonly, eyes. These eyes usually are painted on, dabbed on with a flattened head or adhesively affixed using prefabricated stick-on eyes. One problem identified by Livingston is that of getting the eyes in the same spot on both sides of the head (supra pp. 2 and 100–101). In any event, commercial lures have been manufactured having eyes on both sides of the blade, as shown on page 294 of "Fishing Lure Collectibles" by Dudley Murphy and Rick Edmisten, Collector Books, KY (1997). Also, blades have been manufactured which have multiple eye markings as shown on page 382 of *Old Fishing Lures and Tackle* by Carl F. Luckey, Books Americana, AL (1996). Yet another and more elaborate type of eye design is shown in Pahle U.S. Pat. No. 5,245,782, which describes a multi-faceted outer eye surface for maximum light reflection.

In addition to dots, stripes or other patterns for suggesting the discrete features of a bait fish, other types of surface treatments have been used. These include hammering or imprinting pimples or scales into the blade metal or making fine laser beam cuts into the blade surface so as to provide a prismatic effect as described in Woodruff et al. U.S. Pat. No. 5,084,996. One relatively unusual treatment, described in Pierceall U.S. Pat. No. 4,136,479, is covering the outer surface of the metal with resilient, white, silicon rubber in order to simulate the soft underbelly of a minnow or other bait fish. It appears that fluorescent colors have also been utilized in lure manufacture as indicated by Orlick et al. U.S. Pat. No. D286,317.

As the foregoing suggests, many approaches have been tried in order to design a fishing lure of maximum attraction to the target fish. A common element of several of these approaches is to emulate some feature of a natural bait. Notwithstanding the large number of different lure designs, however, all too frequently there is no response by the target fish to any of one's various lures or the target fish initially respond only to finally pull away moments before any strike occurs. Moreover, there is no definite procedure for selecting one lure over another beyond a hazy recollection of what has worked in the past for a particular type of fish.

Accordingly, a principal object of at least a preferred embodiment of the present invention is to provide a fishing lure having surface features of improved design for attracting fish.

A further object of at least a preferred embodiment of the present invention is to provide a clear procedure for selecting a specific fishing lure over various others available based on objective criteria.

SUMMARY OF THE INVENTION

In accordance with a first aspect of the present invention, a fishing lure is provided having a blade with an inner and outer surface. The outer surface has an outer surface finish while the inner surface has a detail element thereon. Behind the detail element is a background surface finish. The respective surface finishes are selected so that the outer surface finish is of contrasting shade underwater relative to the background surface finish and so that the background surface finish is of contrasting shade underwater relative to the detail element.

This first aspect of the invention arose out of a realization by the present inventor that certain technical principles which he learned while pursuing his doctorate in Optometry could be applied to the field of recreational and commercial fishing. Essentially, this first aspect utilizes the optical theory of "figure" and "ground" which holds that maximum contrast between fine detail and background permits an object to be seen more readily. Applying this principle in the context of what is seen by a fish when viewing a lure underwater, the inventor realized that during initial attraction, while the fish is still far away, the outer surface of the lure acts as the object while the background light in the water acts as "ground." When, on the other hand, the fish is up close to the lure about to strike, any small markings on the inner surface of the lure will act as the object while any background surface finish behind these detail elements will act as ground (in the past, as noted above in the Background section, small markings or other detail have been normally been placed on the outer, not inner, surface). For maximum visibility and attractiveness to the fish, then, the claimed relationship is derived after equating object and ground shadings.

In conjunction with the first aspect of the invention, it is preferable to select colors providing maximum contrast underwater. In order to determine the proper color relationships and again utilizing his optometry background, the inventor devised a viewing mechanism that accounts for the filtration of light occurring from the water's surface to the lure and again from the lure to the position of the fish at the time of initial attraction. Using this mechanism, the inventor objectively determined which color options provided maximum contrast with a light or dark background given different surface treatments. In general, it was determined that fluorescent green, fluorescent yellow and luminescent white provided maximum contrast with a dark background while fluorescent red, fluorescent orange, fluorescent pink, and black provided maximum contrast with a light background.

In accordance with a second aspect of the present invention, a fishing lure is provided having a blade and a detail element on the blade. This detail element includes a reflective surface and a body of semitransparent, fluorescent-colored material projecting above the reflective surface.

This second aspect was conceived by the inventor as a way of further enhancing the visibility of the detail element to the target fish. The projecting profile of the element increases its visibility as does the reflective surface in combination with the fluorescent-colored material. Use of the fluorescent-colored material, in particular, enables the detail element to be in maximum contrast with the surrounding finish.

In accordance with a third aspect of the present invention, a fishing lure is provided having a blade with an inner and outer surface. The inner surface has a detail element on a minor portion of the inner surface, a background surface finish behind the detail element and an inner surface finish behind the background surface finish. The respective surface finishes are selected so that the inner surface finish is of contrasting shade underwater relative to the background surface finish and so that the background surface finish is of contrasting shade underwater relative to the detail element.

The optical principle of figure and ground which was discussed above in connection with the first aspect of the invention also underlies this third aspect. In particular, the visibility of the smaller detail element to the target fish just prior to strike is enhanced by the contrasting underwater shade of the background surface finish. Similarly, the visibility of the background surface finish as the fish starts to close in on the lure is enhanced by the contrasting underwater shade of the inner surface finish.

In accordance with a fourth aspect of the present invention, a method of selecting a fishing lure is provided. This method includes providing an assortment of fishing lures each including a blade which has a detail element on its inner surface and a background surface finish behind the detail element wherein the detail element and background surface finish together define a particular color combination that varies between different ones of the lures. In accordance with this method, three different factors must be determined, namely, whether the water color where the lure is to be used is clear, green or muddy, whether the background light against which the lure will be seen by the target fish is light or dark, and whether the maximum distance over which the target fish will travel to strike the lure is short or long. Finally, a particular one of the lures possessing a particular one of the color combinations is selected based on the water color, the background light, and the maximum strike distance.

As will be made clearer in the detailed portion of this application, this fourth aspect recognizes that it is desirable that the detail element be provided on the inner surface of the lure where it is best seen by the fish just prior to strike and to select the particular color combination defined by the detail element and the background surface finish so as to achieve maximum underwater contrast between these elements and the surrounding bright or dark water whereby maximum visibility of the detail element is afforded the fish. Additionally, this fourth aspect is based on the recognition that in choosing the particular color combination that will provide maximum contrast underwater, it is well to consider the color filtration effect of the water from the water's surface to the lure (as based on water color) and from the lure to the fish (as based on maximum strike distance). Finally, this fourth aspect rests on the recognition that this filtration effect can be duplicated on dry land using optical filters so that the optimal color combination for a particular set of light and water conditions can be conveniently determined objectively.

DETAILED DESCRIPTION OF THE PREFERRED EMBODIMENTS

Figures 1, 2:
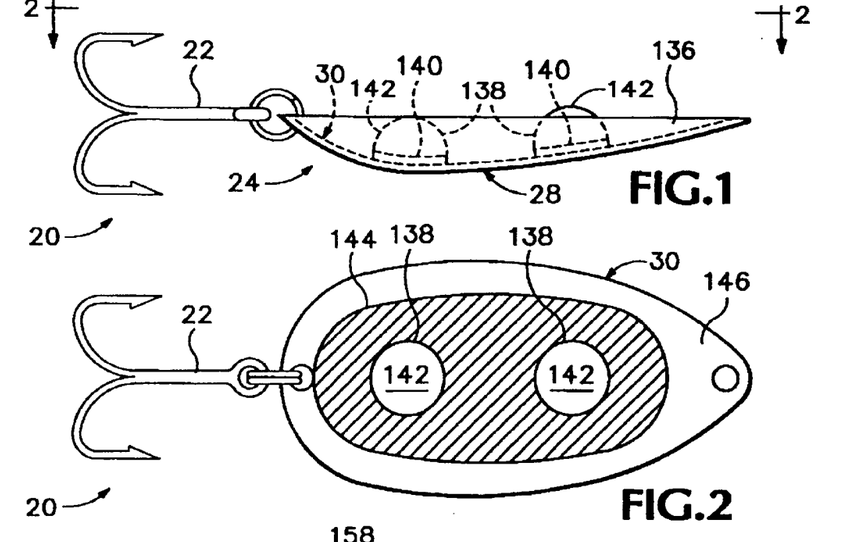
FIG. 1 is a side elevational view of an exemplary fishing lure having a spoon blade constructed in accordance with the present invention, which blade includes detail elements mounted on its inner surface as depicted in dashed-line view.
FIG. 2 is a plan view of the inner surface of the spoon blade as taken along lines 2—2 in FIG. 1.

FIGS. 1 and 2 show a fishing lure 20 constructed in accordance with the present invention. The lure includes a hooking mechanism 22, a blade 24, and an eyelet 26 formed in the blade for attachment of a fishing line so that the blade can be drawn through the water. In this particular embodiment, the blade is a "spoon" and includes an outwardly curving outer surface 28 and inwardly curving inner surface 30 which causes the blade to flutter from side-to-side as it is drawn through the water.

Figure 6:
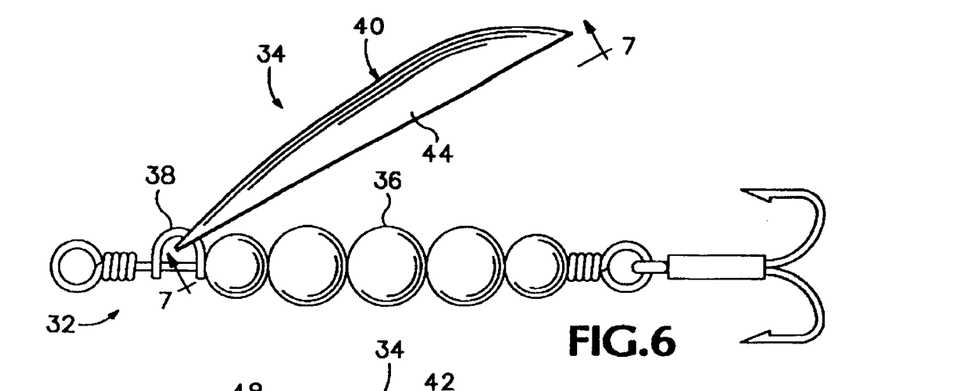
FIG. 6 is a side elevational view of an exemplary fishing lure having a spinner blade constructed in accordance with the present invention.
Figures 7, 8, 9, 10:
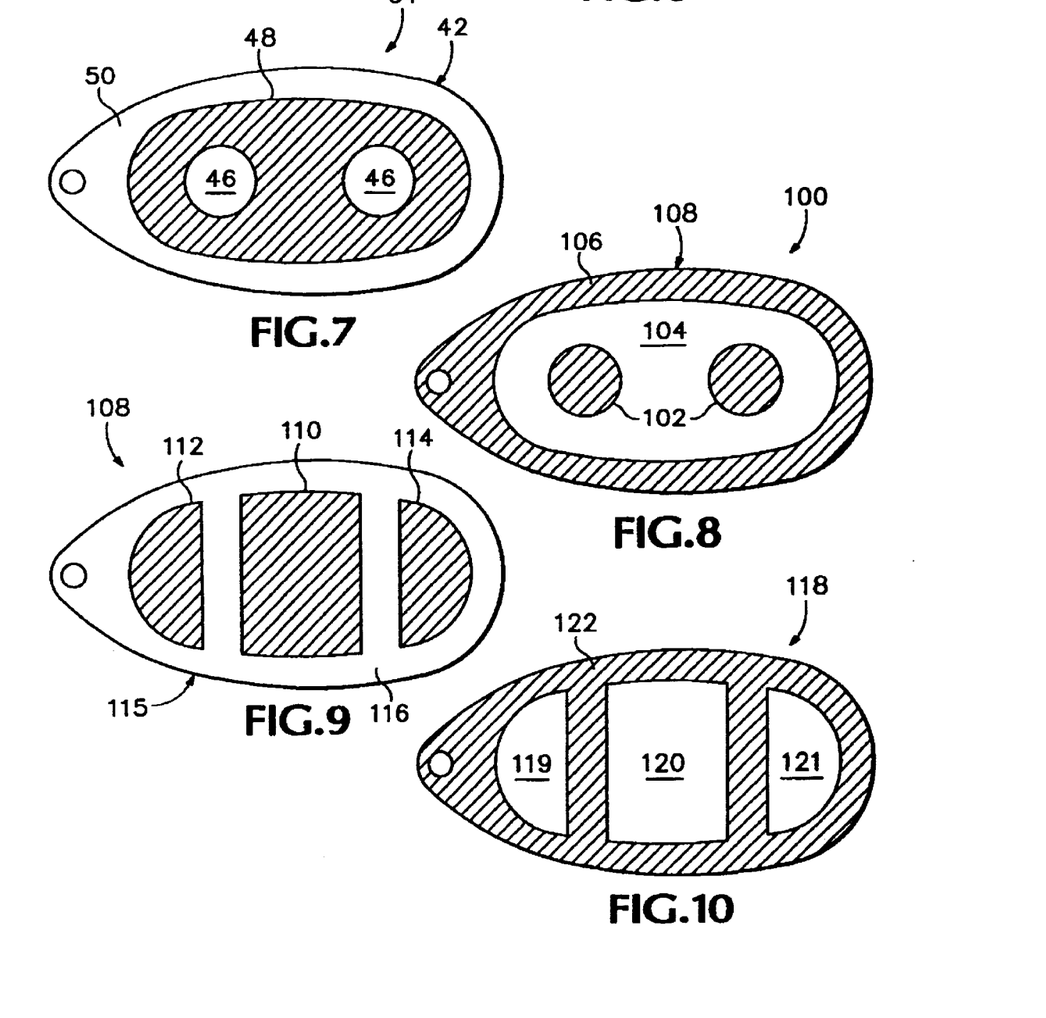
FIG. 7 is a plan view of the inner surface of the spinner blade as taken along lines 7—7 of FIG. 6.
FIG. 8 is a plan view of the inner surface of a first alternative embodiment of the spinner blade as constructed in accordance with the present invention.
FIG. 9 is a plan view of the inner surface of a second alternative embodiment of the spinner blade as constructed in accordance with the present invention.
FIG. 10 is a plan view of the inner surface of a third alternative embodiment of the spinner blade as constructed in accordance with the present invention.

An alternative form of fishing lure 32 constructed in accordance with the present invention is depicted in FIGS. 6–7. This embodiment has a blade 34 which is attached to the main axis 36 of the lure by a rotatable yoke 38 so that the blade becomes a "spinner" which continuously revolves around the main axis while being drawn through the water. In this latter embodiment, the blade is preferably curved, as indicated, or may simply be a flat piece. In either case, the blade includes an outer surface 40 and an inner surface 42.

As used herein and in the claims, the term "outer surface" of the blade will be understood to mean that surface which generally leads as the blade is drawn through the water, that is, the outwardly curving surface 28 (FIG. 1) where the blade is a spoon or the surface 40 facing away from the main axis 36 (FIG. 6) where the blade is a spinner. In accordance with this definition, it will be noted that the outer surface is most visible to the fish while the fish is initially swimming off to one side of the lure while the opposite inner surface is most visible to the fish while the fish is in striking position immediately behind the lure.

An important aspect of the present invention is the manner in which the various surface features of the blade 24 or 34 are selected so that the blade will have optimal visibility and attractiveness to the target fish. Preferably, these features are selected so as to take advantage of the optical principle of "figure" and "ground." According to this principle, maximum contrast between fine detail and background allows an object to be seen more readily.

Based on the foregoing, it will be recognized that normally when the fish first perceives the lure, it will be swimming some distance off to one side, and the outer surface of the blade will be the primary object while the diffused light being transmitted through the water in the region surrounding the blade provides the background. On the other hand, in the moments before the fish is about to strike, while it is swimming just behind the advancing lure, whatever markings or individual details are displayed on the lure will constitute the object while the background finish behind these detail elements will constitute the background. The lure has maximum visibility for the fish, from the time it first notices the lure to the time it actually strikes, if the outer surface finish is selected so as to be in maximum contrast with the underwater background lighting and if the detail elements on the inner surface are selected so as to be in maximum contrast with the underlying background finish.

With regard to the preferred embodiment of the fishing lure 32 shown in FIGS. 6 and 7, blade 34 has an outer surface finish 44 of polished silver. Hence this lure is particularly adapted for use where the level of diffused light in the area of the lure is such that the area is dark. This condition may be due to such factors as an overcast sky, a low angle of the sun, or a preponderance of dark-colored material lining the water. On the opposite inner surface 42 of the blade, a pair of eye-shaped detail elements or dots 46 made of light-colored paint or tape are provided, each covering a minor portion of the inner surface. Behind these elements is a background surface finish 48 which, for the preferred embodiment depicted, constitutes a large dark-colored patch of tape or paint. As the spinner blade 34 revolves, the light-colored dots "flash" in the dark water, which effect is all the more pronounced because of the highly contrasting shade of the dark-colored patch.

In the particular embodiment shown in FIGS. 6 and 7, the tape or paint used to form the detail elements or dots 46 are colored fluorescent kelly green. The dark-colored patch of tape or paint 48 behind the dots is colored fluorescent red. The remainder of the blade 34, including the outer surface finish 44 and a corresponding inner surface finish 50, is of polished silver.

Under specific water conditions, the above color combination provides maximum light and dark contrast between the various surface elements. For example, if the water is dark in the area surrounding the lure, perhaps because of overcast sky, then the bright flash of the polished silver forming the outer surface finish 44 will be in marked contrast to this dark water so as to readily arouse the initial interest of the fish. If also the water is clear, bluish, and sufficiently cold that the fish are too sluggish to strike at long distances, then the fluorescent kelly green dots 46 will appear to the fish as light-colored in the dark water. The fluorescent red background 48, on the other hand, will appear dark-colored, thereby contrasting with the dots. By means of this contrast the dots appear brighter to the fish as they trail the lure moments before striking. The dark underwater shade of the background also contrasts with the shine of the inner surface finish 50. This increases the visibility of the blade's inner surface 42 from the intermediate range of distance initially assumed by the fish when they first align themselves behind the lure. It may be generally noted that fluorescent colored surfaces are light emitters and are not merely passive reflectors so that, within a glossy medium such as water, their use permits sharper contrasts to be made so that maximum visibility is achieved.

Figure 11:
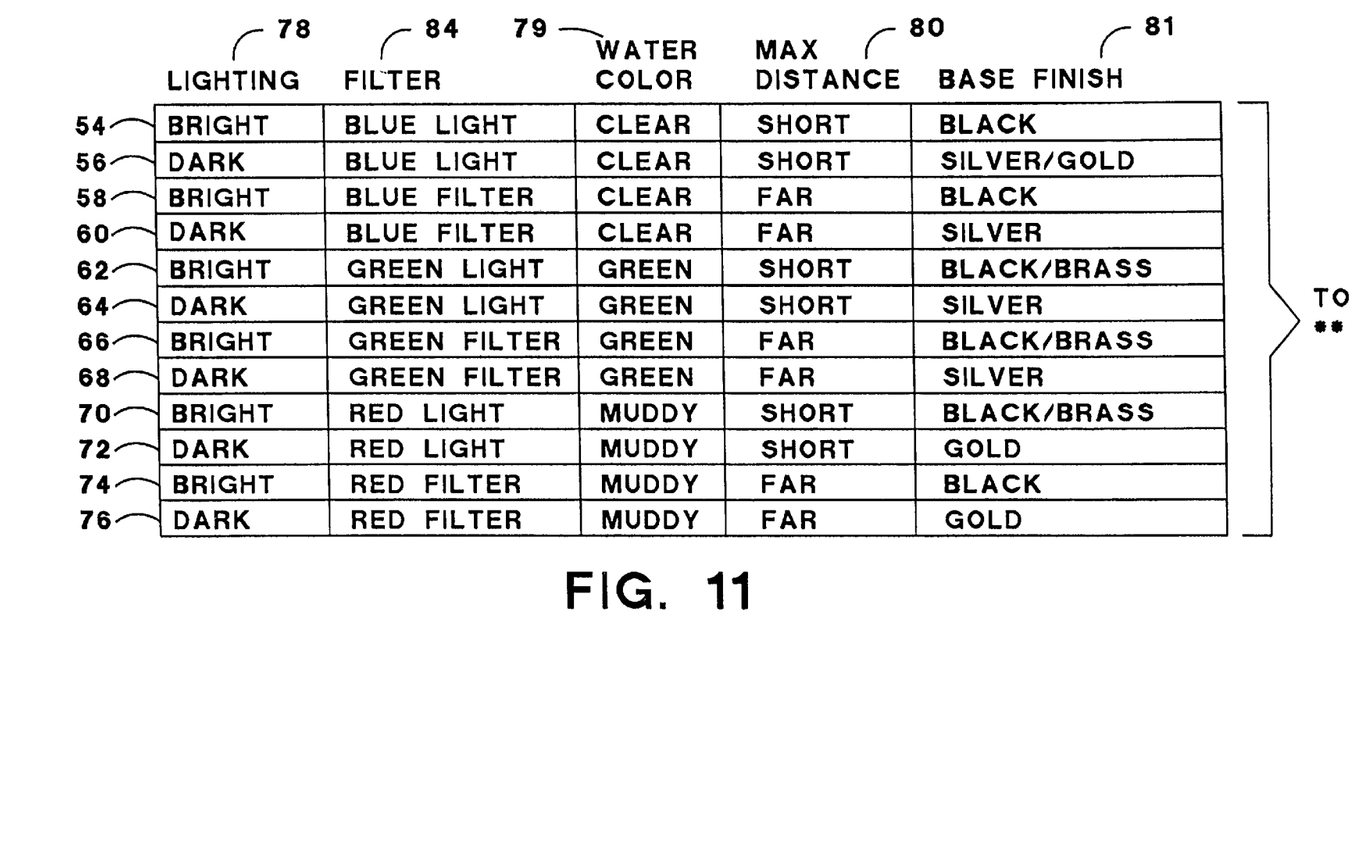
FIG. 11 is a table completed in accordance with the present invention showing optimal surface finish selections for given water conditions.

The preferred color combinations for various water and lighting conditions are listed in table 52 of FIG. 11. In the table, twelve different conditions, respectively labeled 54, 56, 58, 60, 62, 64, 66, 68, 70, 72, 74, and 76, are set forth. Three factors characterize each condition, namely the nature of the underwater "lighting" 78 that illuminates the lure, the "color" 79 of the water, and the "maximum distance" 80 that the fish will travel in order to strike the lure (the latter factor can depend, for example, on how cold the water is, as this can determine how sluggish the fish will be, or whether the water's floor has deep pockets that would prevent bottom-dwelling fish from viewing faraway objects). For each of the twelve conditions, the preferred detail coloration 81 (e.g., dot color), background finish 82 (e.g., surrounding patch) and base finish 83 (e.g., outer finish and inner marginal finish) are specified. Except for black and the metallic finishes, the colors listed will be understood to be fluorescent colors.

Continuing with the example described earlier above where the lighting is dark, the water is clear, and the fish are sluggish, it will be recognized that this scenario corresponds to condition 56 in table 52. It will be noted that the described selection of colors for the exemplary lure 32 shown in FIGS. 6 and 7 is also listed, that is, silver is listed as one of the options for the base finish (corresponding to the outer and inner surface finishes 44 and 50), red (understood to be of the fluorescent variety) is listed as one of the options for the background surface finish 48 and green (understood to be fluorescent) is listed as the option for the detail coloration (dots 46). Alternatively, as the table indicates, for the same condition, one could also use a gold blade where the inner side of the blade includes fluorescent green dots on a fluorescent pink background. In all, six different alternatives can be inferred from table 52 for this particular condition (three for a silver blade and three for a gold).

It will be noted that table 52 includes a column 84 labeled "filter." In order to objectively determine which surface colors should be used with which water conditions, the present inventor examined various color combinations using an optical filter system designed to replicate the effects of the water. For example, to determine which colors would provide maximum contrast in dark water, the inventor arranged a number of different color patches on a dark sheet. In order to replicate the filtering effect of the water between the water's surface and the lure, these patches were then illuminated through a colored filter, either blue for clear water, green for green water or red for brown or muddy water. In order to replicate the filtering effect of the water between the lure and the fish, these patches were then observed through a second filter, either corresponding in color to the first filter for when the fish would be striking from a far distance or a clear ("light") filter for when the fish would be striking from only a short distance away. In this manner, those colors which provided maximum underwater contrast for a given set of conditions were systematically and objectively determined.

Thus, with respect to condition 56, table 52 indicates in column 84 that a "blue" filter was used as the first filter and a "light" or clear filter was used as the second filter in selecting the proper colors for this condition. With respect to condition 76, table 52 indicates that a "red" filter was used as the first filter and a corresponding red "filter" was used as the second filter. With respect to condition 54, table 52 indicates that the same filters were used as for condition 56; however, here a light sheet (as seen through the filters) was placed behind the sample color patches rather than a dark in order to simulate the bright background lighting. The results from each trial were confirmed using underwater photography.

It may be noted that although various color alternatives are presented in table 52, not all of these alternatives are equally advantageous. Thus, although either silver or gold may be used as the base finish for the blade in respect to condition 56, it is more advantageous to use silver. This is not only because of relative cost, but because silver can also be used together with a red or pink or orange background and green detail in respect also to conditions 64 and 68. In respect to condition 60, the silver, black, and luminescent white combination that is indicated is only applicable to that condition. With respect to condition 76, although luminescent white is given as one of the alternatives for the detail, it is more advantageous to select the yellow color since the gold, black, yellow combination is applicable also to condition 72. As summarized, then, in table 86 of FIG. 12, each of the six conditions 56, 60, 64, 68, 72 and 76 in FIG. 11 can be responded to with one of the two silver-based preferred combinations 88 or 90 or the gold-based preferred combination 92. Of course, as previously mentioned in reference to table 52, except for black and the metallic colors, the colors listed in table 86 are intended to signify fluorescent colors.

Figure 12:
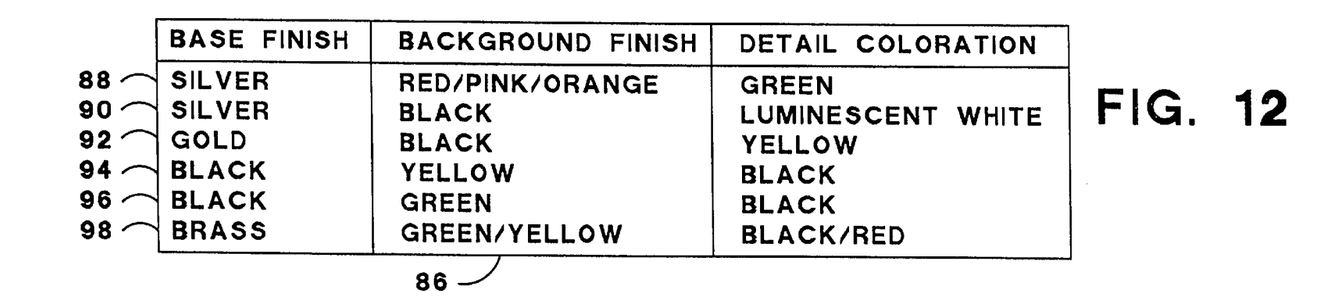
FIG. 12 is a table completed in accordance with the present invention showing the six different surface finish selections of greatest utility.

Of the six conditions 54, 58, 62, 66, 70 and 74 in table 52 that refer to a bright lightning condition, the color combination of black for the base finish, yellow for the background, and black for the detail coloration can be used in respect to five of these conditions. Condition 70, which is the exception, refers to a situation in which muddy water is found together with a bright background. However, in reality, this situation is not likely to be commonly encountered because muddy water usually results from stormy weather which, in turn, normally occurs under an overcast sky. Hence, the corresponding lighting would, in all likelihood, be dark. Accordingly, the black, yellow, black color combination, which is listed as item 94 in table 86, would be suitable in most practical situations where the diffused underwater lighting in the area surrounding the lure is relatively bright.

Another color combination that is generally suitable for a bright lightning condition is black for the base finish, green for the background finish and black for the detail coloration. As indicated in table 52, this combination is suitable for conditions 54, 58, 62, and 66. Although not having quite the universal applicability of the black, yellow, black combination described in the paragraph above, still this combination is suitable for many bright lighting conditions and, accordingly, is listed as item 96 in table 86.

In table 86 of FIG. 12, the last color combination 98 listed is based on a blade having a base finish made of brass (herein understood to mean dark brass). Along with silver, gold, and black, brass is another material commonly used in the manufacture of fishing lures. As indicated in table 52, for a brass finish, in order to obtain a lure of widest possible use, preferably the colors selected for the background finish are green or yellow while the colors selected for the detail coloration are black or red, in which case the resulting combination will be suitable for use in respect to conditions 62 and 66. In summary, then, table 86 of FIG. 12 is a convenient listing, in order of the material used for the base finish, of those color combinations of table 52 which have the widest or most universal applicability.

A first alternative embodiment 100 of the spinner blade is shown in FIG. 8. Contrasting this blade with the spinner blade 34 shown in FIG. 7, it will be recognized that the colors have been reversed. Thus, while the spinner blade 34 had a light/dark/light (fluorescent green/fluorescent red/silver) color combination on its inner surface 32 and was designed for use in darkly lit water, spinner blade 100 has a dark/light/dark color combination designed for use in brightly lit water. For the particular embodiment shown, the pair of eye-shaped detail elements or dots 102 are formed from two black spots of paint or tape, the background surface finish 104 is formed from a fluorescent yellow strip of paint or tape, and the base finish 106 of the outer surface (not shown) and inner surface 108 is black. This color combination, which corresponds to that labeled as item 94 in FIG. 12, will substantially result in the eyes or dots 102 and outer surface being in sharp contrast to the bright water, which effect will be enhanced in respect to the eyes by the light underwater color of the fluorescent yellow background 104.

A second alternative embodiment 108 of the spinner blade is shown in FIG. 9. In this embodiment, the center detail element 110 is not eye-shaped in the sense that it lacks an arc-shaped side that might suggest the eye of a bait fish to a larger target fish. Other types of details that might be used on the inner surface are throat markings, scale patterns, or wavy bands, although some form of eye-shape (circle, oval, semicircle, crescent, etc.) is preferable as being likely to induce the most interest in the target fish. Also, there are multiple detail elements 110, 112, and 114, instead of only a pair, although even a single detail element on a smaller blade would suffice for meeting the requirements of the present invention in at least its broadest form. Another difference from the color combinations previously described is that the background surface finish 116 extends completely to the edges of the blade, therefore completely covering the inner surface 115. In general, however, it is preferable to have a surrounding marginal inner surface finish 50, as shown in FIG. 7, so that, as described above, the inner surface is more visible to the fish from an intermediate distance as the fish initially aligns itself behind the lure.

FIG. 10 shows a third alternative embodiment 118 of a spinner blade. This particular embodiment is quite similar to that shown in FIG. 9 except that a light/dark color combination is used for the detail elements 119, 120, 121 and the background surface finish 122, respectively, instead of the reverse. The outer surface (not shown) of spinner blade 118 preferably will be of polished light-colored metal (e.g., silver) so that both this surface and the detail elements sharply contrast with the dark surrounding water for which this blade is designed, while the dark-colored background finish serves to make the light-colored detail elements that much more pronounced. As in the foregoing description, the terms light-colored and dark-colored refer to the underwater color so that, referring to FIGS. 11 and 12 for example, a suitable color for the detail elements would include fluorescent green and for the background finish would include fluorescent red.

FIGS. 1 and 2, as described above, show an exemplary "spoon" type fishing lure 20 constructed in accordance with the present invention. Whereas the blade 34 of the "spinner" type lure in FIGS. 6 and 7 is designed to revolve around the main axis 32 of that lure, the blade 24 of this spoon type lure is designed to flutter from side-to-side as the lure is drawn through the water. With respect to the particular embodiment shown, the outer surface finish 136 is light-colored, preferably of a shiny metallic finish such as silver. The detail elements 138 on the inwardly curving inner surface 30 of the lure are also light-colored; however, in contrast to the spots of paint or tape used with the embodiments described previously, these detail elements are three-dimensional in overall form.

In respect to the particular embodiment depicted in FIGS. 6 and 7, each detail element 138 comprises a highly reflective or silvered back surface 140 and a body of semitransparent, fluorescent-colored material 142 that projects prominently above the highly reflective surface. This material, for the embodiment depicted, is made of a convex-shaped, clear plastic bead containing a highly fluorescent kelly green dye. Except for the fluorescent coloration, these detail elements resemble the "stick-on stones" that are used by children for face decoration. Not only does the protruding profile of the elements allow them to be seen more easily by the fish despite the depression formed by the inwardly curving inner surface 30, but also the combination of the reflective surface and the overlying fluorescent material enhances the brightness of these detail elements in darkly lit water.

The visibility of the detail elements 138 is further enhanced, in accordance with the "figure/ground" effect previously described, by the sharply contrasting dark shade of the surrounding background surface finish 144. For the preferred embodiment depicted, this finish is fluorescent red in color (fluorescent pink or fluorescent orange could also be used). Surrounding the background surface finish, in turn, is the light-colored inner surface finish 146 which, for the embodiment depicted, is polished silver in correspondence with the outer surface finish 136. This inner surface contrasts with the background surface finish so as to enhance the visibility of the inner surface 30 for a fish aligning itself with the blade 24 while still an intermediate distance away from the lure.

Figure 3:
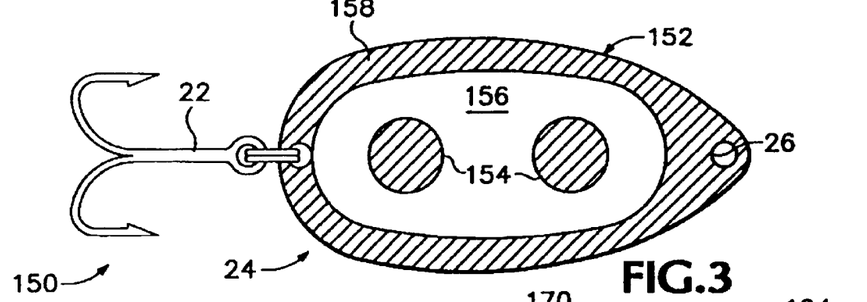
FIG. 3 is a plan view of the inner surface of a first alternative embodiment of the spoon blade as constructed in accordance with the present invention.

FIG. 3 shows a first alternative embodiment 150 of a spoon type blade. This embodiment is similar to that shown in FIG. 2 except that the pattern on the inner surface 152 is reversed so as to provide a dark/light/dark combination in order to adapt the blade for use in brightly lit water. For the particular embodiment depicted, the detail elements 154 comprise plastic beads of fluorescent red on silvered backings, the background surface finish 156 is of fluorescent yellow (or, more specifically, chartreuse) and the base finish, including the inner surface finish 158 and the outer surface finish (not shown), is of black.

Figures 4, 5:
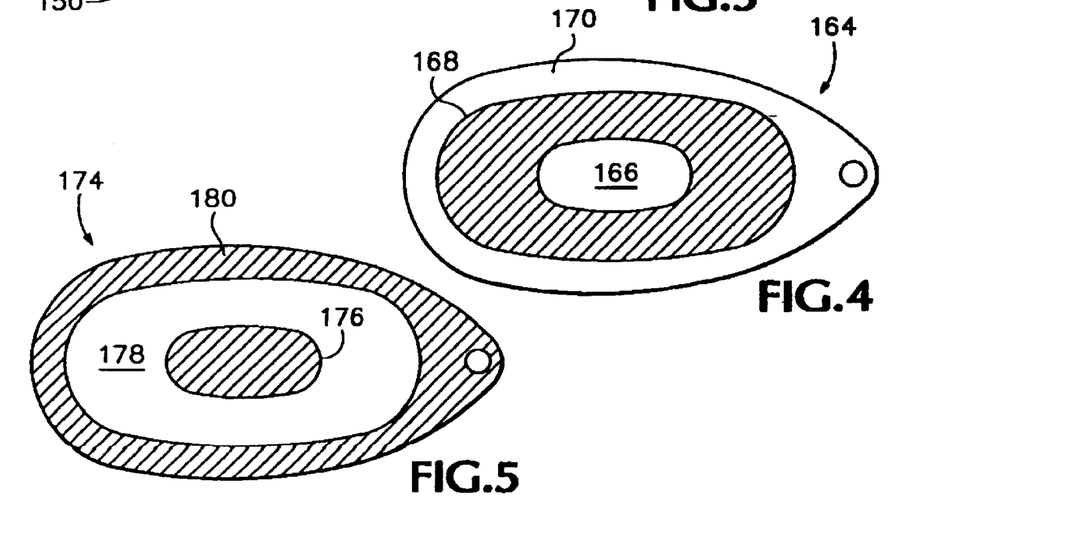
FIG. 4 is a plan view of the inner surface of a second alternative embodiment of the spoon blade as constructed in accordance with the present invention.
FIG. 5 is a plan view of the inner surface of a third alternative embodiment of the spoon blade as constructed in accordance with the present invention.

A second alternative embodiment 164 of a spoon type lure is shown in FIG. 4. This embodiment, which has a light/dark/light color combination, is designed for use in darkly lit water. The primary difference between this lure and that shown in FIG. 2 is that here the detail element 166 is a flat strip of paint or tape. Although this reduces the percentage of time that the detail element will be visible to the fish as the curved blade flutters back-and-forth, this disadvantage is offset to some extent by the larger size of the detail element. (When the detail element is raised, as shown in FIGS. 1 and 2, its size is constrained somewhat by the need to not unduly impede the normal flutter action of the blade). Referring to table 86, a suitable color combination would include a detail element 166 of fluorescent green, a background surface finish 168 of fluorescent red, and a base finish, including an inner surface finish 170 and an outer surface finish (not depicted), of polished silver.

FIG. 5 shows a third alternative embodiment 174 of a spoon type lure. This embodiment is similar in construction to that shown in FIG. 4 except that a dark/light/dark color combination is used to adapt the lure for use in brightly lit water. Referring to table 86, a suitable color combination would include black for the detail element 176, fluorescent green for the background surface finish 178, and black for the base finish including the inner surface finish 180. As with the embodiment shown in FIG. 4, a strip of paint or tape is used for the detail element.

It may be noted here that just as the detail element can be variously formed in respect to the spoon type lure, so too can it be variously formed in respect to the spinner type lure. That is, it is possible to substitute raised fluorescent beads, constructed in the manner previously described, for the flat detail elements 46 and 102 of the spinner blades that are shown in FIGS. 6–8, provided that the spinner blades are sized sufficiently relative to these raised elements that such elements will not interfere with the spinning motion of the blades.

From the foregoing description, it will be apparent how, in a practical situation, a suitable fishing lure of maximum attractiveness to the target fish can be selected in accordance with the present invention. For example, for the sake of illustration, assume that an assortment of fishing lures constructed in the manner described above are brought to the fishing site, which lures include a series of spinners and spoons, each series including at least the three color combinations 88, 90, and 94 shown in FIG. 12. Assume further that it is determined that the water color is green, that the target fish are river salmon that prefer to feed at lower depths in darker water, and that the season is winter with the water sufficiently cold to slow the metabolism of the fish so that they will only strike from a short distance away. In this situation, which corresponds to condition 64 in FIG. 11, preferably that spinner or spoon having color combination 88 is selected. This particular combination, being included among those listed for condition 64, ensures that the surface features of the lure have maximum visibility and attractiveness to the fish.

As will be evident from the foregoing, at least the broader aspects of the present invention can be advantageously utilized without restriction to a particular type of fishing lure. Furthermore, a clear procedure is described, in accordance with the present invention, for selecting a fishing lure over various others available so as to objectively select a lure of maximum visibility and attractiveness to the target fish.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A fishing lure comprising:
   (a) a blade, said blade having an outer surface and an inner surface;

(b) said outer surface having an outer surface finish on at least a major portion thereof;

(c) said inner surface having a detail element and a background surface finish behind said detail element;

(d) said outer surface finish being of contrasting shade underwater relative to said background surface finish; and (e) said background surface finish being of contrasting shade underwater relative to said detail element.

2. The fishing lure of claim 1 wherein said detail element is eye-shaped.

3. The fishing lure of claim 1 wherein said inner surface has an inner surface finish behind said background surface finish, said inner surface finish being of contrasting shade underwater relative to said background surface finish.

4. The fishing lure of claim 1 wherein said detail element includes a reflective surface.

5. The fishing lure of claim 1 wherein said outer surface finish is substantially metallic silver, said background surface finish is substantially one of the following: fluorescent pink, fluorescent red or fluorescent orange, and said detail element is substantially fluorescent green.

6. The fishing lure of claim 1 wherein said outer surface finish is substantially metallic silver, said background surface finish is substantially black, and said detail element is substantially luminescent white.

7. The fishing lure of claim 1 wherein said outer surface finish is substantially metallic gold, said background surface finish is substantially black, and said detail element is substantially fluorescent yellow.

8. The fishing lure of claim 1 wherein said outer surface finish is substantially black, said background surface finish is substantially fluorescent yellow, and said detail element is substantially black.

9. The fishing lure system of claim 1 wherein said outer surface finish is substantially black, said background surface finish is substantially fluorescent green, and said detail element is substantially one of the following: black or fluorescent red.

10. The fishing lure of claim 1 wherein said outer surface finish is substantially of dark metallic brass, said background surface finish is substantially one of the following: fluorescent green or fluorescent yellow, and said detail element is substantially one of the following: black or fluorescent red.

11. The fishing lure of claim 1 wherein said detail element is on a minor portion of said inner surface.

12. The fishing lure system of claim 1 wherein said detail element is completely surrounded by said background surface finish.

13. A fishing lure comprising:

(a) a blade having an outer surface and an inner surface;

(b) a detail element on said inner surface including a reflective surface and a body of semitransparent, fluorescent-colored material projecting above said reflective surface;

(c) said inner surface having a background surface finish behind said detail element, said background surface finish being of contrasting shade relative to said detail element; and (d) said outer surface having an outer surface finish on at least a major portion of thereof, said outer surface finish being of contrasting shade underwater relative to said background surface finish.

14. The fishing lure of claim 13 wherein said blade has an outwardly curving outer surface and an inwardly curving inner surface, said detail element being positioned on said inner surface.

15. The fishing lure of claim 13 wherein said body is a bead of plastic.

16. The fishing lure of claim 13 wherein said body has a convex profile.

17. A fishing lure comprising:

(a) a blade, said blade having an outer surface and an inner surface;

(b) said inner surface having a detail element, a background surface finish behind said detail element, and an inner surface finish behind said background surface finish;

(c) said inner surface finish being of contrasting shade underwater relative to said background surface finish;

(d) said background surface finish being of contrasting shade underwater relative to said detail element; and (e) said outer surface having an outer surface finish of contrasting shade underwater to said background surface finish.

18. The fishing lure of claim 17 wherein said inner surface finish is shiny metallic, said background surface finish is substantially one of the following: fluorescent pink, fluorescent red or fluorescent orange, and said detail element is substantially fluorescent green.

19. The fishing lure of claim 17 wherein said inner surface finish is shiny metallic, said background surface finish is substantially black, and said detail element is substantially one of the following: luminescent white or fluorescent yellow.

20. The fishing lure of claim 17 wherein said inner surface finish is substantially one of the following: black or dark metallic brass, said background surface finish is substantially one of the following: fluorescent green or fluorescent yellow, and said detail element is substantially one of the following: black or fluorescent red.

21. A fishing lure selection method comprising:

(a) providing an assortment of fishing lures each including a blade having an inner surface, a detail element on said inner surface, and a background surface finish behind said detail element, said detail element and said background surface finish together defining a particular color combination that varies between different ones of said lures;

(b) determining whether the water color where said lure is to be used is clear, green or muddy;

(c) determining whether the background light against which said lure will be seen underwater by the target fish is light or dark;

(d) determining whether the maximum distance over which said target fish will travel to strike said lure is short or long;

(e) selecting a particular one of said lures possessing a particular one of said color combinations based on said water color, said background light and said maximum distance.

22. The fishing lure selection method of claim 21 wherein step (e) includes selecting a lure possessing a particular color combination such that said detail element is substantially fluorescent green and said background surface finish is substantially one of the following: fluorescent red, fluorescent pink or fluorescent orange when said water color is either clear or green, said background light is dark and said maximum distance is short.

* * * * *

UNITED STATES PATENT AND TRADEMARK OFFICE
CERTIFICATE OF CORRECTION

PATENT NO. : 6,131,329
DATED : October 17, 2000
INVENTOR(S) : Kageyama

It is certified that error appears in the above-identified patent and that said Letters Patent is hereby corrected as shown below:

<u>Column 7,</u>
Line 58, change "lightning conditions" to -- lighting conditions --
Line 11, change "red "filter" to -- "red" filter --

Signed and Sealed this

Twenty-third Day of April, 2002

Attest:

Attesting Officer

JAMES E. ROGAN
Director of the United States Patent and Trademark Office